United States Patent
Fukuda

(10) Patent No.: US 9,963,239 B2
(45) Date of Patent: May 8, 2018

(54) NITROGEN ENRICHED AIR SUPPLY SYSTEM AND AIRCRAFT

(71) Applicant: Mitsubishi Aircraft Corporation, Aichi (JP)

(72) Inventor: Koki Fukuda, Aichi (JP)

(73) Assignee: MITSUBISHI AIRCRAFT CORPORATION, Aichi (JP)

(*) Notice: Subject to any disclaimer, the term of this patent is extended or adjusted under 35 U.S.C. 154(b) by 140 days.

(21) Appl. No.: 14/070,811

(22) Filed: Nov. 4, 2013

(65) Prior Publication Data
US 2016/0009408 A1    Jan. 14, 2016

(30) Foreign Application Priority Data
Nov. 9, 2012 (JP) ................. 2012-247268

(51) Int. Cl.
| | | |
|---|---|---|
| *B01D 53/02* | (2006.01) | |
| *B64D 37/32* | (2006.01) | |
| *B01D 53/22* | (2006.01) | |
| *G05D 7/06* | (2006.01) | |
| *B64D 13/06* | (2006.01) | |

(52) U.S. Cl.
CPC ........... *B64D 37/32* (2013.01); *B01D 53/22* (2013.01); *G05D 7/0635* (2013.01); *B01D 2053/221* (2013.01); *B01D 2053/224* (2013.01); *B01D 2256/10* (2013.01); *B01D 2257/104* (2013.01); *B01D 2258/06* (2013.01); *B01D 2259/4575* (2013.01); *B64D 2013/0677* (2013.01)

(58) Field of Classification Search
CPC .............................. B64D 37/32; Y10S 261/02
See application file for complete search history.

(56) References Cited

U.S. PATENT DOCUMENTS

| | | | |
|---|---|---|---|
| 4,556,180 A * | 12/1985 | Manatt | ...................... 244/135 R |
| 6,547,188 B2 | 4/2003 | Schmutz et al. | |
| 7,971,828 B2 | 7/2011 | Massey et al. | |
| 2004/0000353 A1* | 1/2004 | Jones | ............................... 141/64 |
| 2004/0065383 A1* | 4/2004 | Jones et al. | ...................... 141/66 |
| 2004/0065778 A1* | 4/2004 | Jones | ...................... 244/135 R |
| 2004/0226438 A1* | 11/2004 | Jones | ............................... 95/45 |
| 2005/0115404 A1* | 6/2005 | Leigh et al. | ..................... 95/11 |

(Continued)

FOREIGN PATENT DOCUMENTS

JP    2008508136 A    3/2008

OTHER PUBLICATIONS

Notice of Reasons for Rejection issued in Japanese application No. 2012-247268 dated Jun. 28, 2016.

*Primary Examiner* — Christopher P Jones
(74) *Attorney, Agent, or Firm* — Pearne & Gordon LLP

(57) ABSTRACT

To provide a system which supplies nitrogen enriched air (NEA) produced by using bleed air as a supply source of the NEA to a fuel tank, and which can further improve the fuel consumption. The present invention employs an NEA supply system 10 that controls a supply in a flow control valve (FCV) 11 so as to obtain a supply flow rate Fs as a value obtained by adding a small margin flow rate Fm to a required amount Fn of nitrogen enriched air required to be supplied to a first fuel tank 15, in at least a part of a descent phase of an aircraft 100. Accordingly, explosion of the first fuel tank 15 can be prevented, and the fuel consumption of an engine 1 can be improved in the descent phase.

7 Claims, 3 Drawing Sheets

(56) References Cited

U.S. PATENT DOCUMENTS

| | | | |
|---|---|---|---|
| 2005/0224654 A1* | 10/2005 | Loss et al. | 244/129.2 |
| 2005/0247197 A1* | 11/2005 | Snow, Jr. | 95/138 |
| 2007/0023577 A1* | 2/2007 | Jones | 244/135 R |
| 2010/0310392 A1* | 12/2010 | Lippold et al. | 417/405 |

* cited by examiner

NITROGEN ENRICHED AIR SUPPLY SYSTEM AND AIRCRAFT

BACKGROUND OF THE INVENTION

Field of the Invention

The present invention relates to a system which supplies gas enriched with nitrogen more than air to an aircraft fuel tank.

Description of the Related Art

Since an aircraft fuel tank is filled with vaporized fuel during a flight, it is necessary to prevent explosion of the fuel tank when, for example, the fuel tank is struck by lightning or a short occurs in the wiring. Thus, there has been proposed an explosion-proof system which supplies nitrogen enriched air (referred to as NEA below) having a higher nitrogen concentration and a lower oxygen concentration than air to the fuel tank.

While the air has an oxygen concentration of about 21%, the oxygen concentration of the NEA is set to, for example, 12% or less. To produce the NEA, an air separation module (ASM) that uses a permselective membrane having different permeability coefficients for oxygen molecules and nitrogen molecules is employed. Bleed air from a flight engine is used as a supply source of air to be supplied to the air separation module.

In the explosion-proof system in which the bleed air is used as the supply source of the NEA, it is necessary to increase the amount of bleed air from the engine so as to increase the amount of NEA to be supplied to the fuel tank. In this case, the fuel consumption of the engine is deteriorated. When the supply of the bleed air is increased, the oxygen concentration tends to become higher (the nitrogen concentration tends to become lower) in relation to the separation performance of the air separation module. For example, when the supply is increased to more than that by which an oxygen concentration of 10% is obtained, the oxygen concentration may be increased to 12% even by using the same air separation module.

U.S. Pat. No. 6,547,188 proposes a process for supplying NEA to an aircraft fuel tank.

U.S. Pat. No. 6,547,188 employs the concentration of inert gas in the NEA, and the supply of the NEA to the fuel tank as a target of control. In U.S. Pat. No. 6,547,188, the two control targets are adjusted according to a flight phase from takeoff to landing of the aircraft. In U.S. Pat. No. 6,547,188, the flight phase is divided into a phase from takeoff until entering a descent phase for landing through an ascent phase and a cruising phase (referred to as first phase below), and the descent phase (referred to as second phase below).

In U.S. Pat. No. 6,547,188, a relatively small amount of NEA is supplied in the first phase, and a relatively large amount of NEA is supplied in the second phase. It is described in U.S. Pat. No. 6,547,188 that the supply of the NEA to the fuel tank is increased in the second phase so as to compensate for an increase in the atmospheric pressure since the altitude is lowered in the second phase.

In U.S. Pat. No. 6,547,188, the concentration of the inert gas (typically, nitrogen gas) is set to a relatively high level of, for example, 98% in the first phase, and to a relatively low level of, for example, 86 to 95% in the second phase. It is described therein that the nitrogen concentration can be reduced in the second phase since the fuel tank contains a large amount of nitrogen gas in the first phase.

In accordance with U.S. Pat. No. 6,547,188, it is possible to prevent explosion of the fuel tank while improving the fuel consumption. In aircraft, however, there is always a demand for a decrease in the running costs.

The present invention has been made in view of such problems, and an object thereof is to provide a system which supplies NEA produced by using bleed air as an NEA supply source to a fuel tank, and which can further improve the fuel consumption.

SUMMARY OF THE INVENTION

The present invention provides a system which supplies nitrogen enriched air (NEA) that is enriched with nitrogen more than air to a fuel tank of an aircraft, the system including: a nitrogen enrichment unit that produces the NEA upon supply of bleed air from a flight engine of the aircraft; a flow regulation unit that controls a supply of the NEA to the fuel tank; and a control unit that controls the supply in the flow regulation unit.

In the nitrogen enriched air supply system according to the present invention, the control unit controls the supply in the flow regulation unit so as to obtain a supply flow rate Fs having a predetermined relationship with a required amount Fn of the nitrogen enriched air required to be supplied to the fuel tank in at least a part of a descent phase of the aircraft.

In the present invention, the required amount Fn may be determined based on a state equation for gas, and the supply flow rate Fs may be set by adding a margin flow rate Fm to the required amount Fn. Accordingly, the supply flow rate Fs can be appropriately and accurately set in response to a change in the altitude of the aircraft during the descent phase.

More specifically, in the present invention, the required amount Fn may be obtained based on a following expression (3).

$$\Delta n = \Delta P \cdot Vu / R \cdot T \qquad (3)$$

($\Delta n$: Physical amount of gas, $\Delta P$: Pressure variation per unit time, $Vu$: Empty capacity of internal space of fuel tank, $R$: Constant of gas, $T$: Temperature)

In the present invention, at least following two methods can be employed so as to obtain a pressure variation $\Delta P$ in the expression (3).

The first method is to multiply a variation ratio (dp/dh) per unit time of the pressure of the internal space of the tank along with a change in the altitude of the aircraft, by a variation ratio (dh/dt) of the altitude of the aircraft per unit time. In this case, actual measurement values may be used for dp/dh and dh/dt. A known value may be also used for dp/dh.

The second method is to directly obtain a pressure variation (dp/dt) per unit time by successively measuring the pressure during the flight of the aircraft.

Next, the supply flow rate Fs is obtained as follows.

That is, information prepared in advance by adding the margin flow rate Fm to the required amount Fn may be used so as to obtain the supply flow rate Fs. In the information, the required amount Fn and a value obtained by adding the margin flow rate Fm to the required amount Fn are related to each other. When the required amount Fn is obtained, the value obtained by adding the margin flow rate Fm thereto is employed as the supply flow rate Fs. For example, information in the table form corresponds to the information. In the present invention, the supply flow rate Fs may be also obtained by sequentially performing an arithmetic operation of adding the margin flow rate Fm to the required amount Fn when the required amount Fn is obtained without using the information obtained in advance. However, when the information prepared by adding the margin flow rate Fm in advance is used, the load of the arithmetic processing can be advantageously reduced.

Next, when the supply flow rate Fs is obtained, a constant may be employed as the margin flow rate Fm, or a value (Fm=K·Fn) obtained by multiplying the required amount Fn by a predetermined ratio K (e.g., 0.2 to 0.4) may be employed as the margin flow rate Fm.

In the present invention, the concentration of nitrogen contained in the NEA supplied to the fuel tank may be gradually decreased in the descent phase of the aircraft.

Accordingly, the concentration of oxygen in the supplied NEA is gradually increased. The risk of fuel explosion can be thereby further reduced.

The present invention also provides an aircraft including an NEA supply system having the above function.

Since the nitrogen enriched air supply system according to the present invention controls the supply in the flow regulation unit so as to obtain the supply flow rate Fs having a predetermined relationship with the required amount Fn of the nitrogen enriched air required to be supplied to the fuel tank, it is not necessary to produce more NEA than required. Accordingly, the present invention can prevent explosion of the fuel tank while improving the fuel consumption of the aircraft by suppressing the bleed air introduced from the engine.

DETAILED DESCRIPTION OF THE PREFERRED EMBODIMENTS

Figure 1:
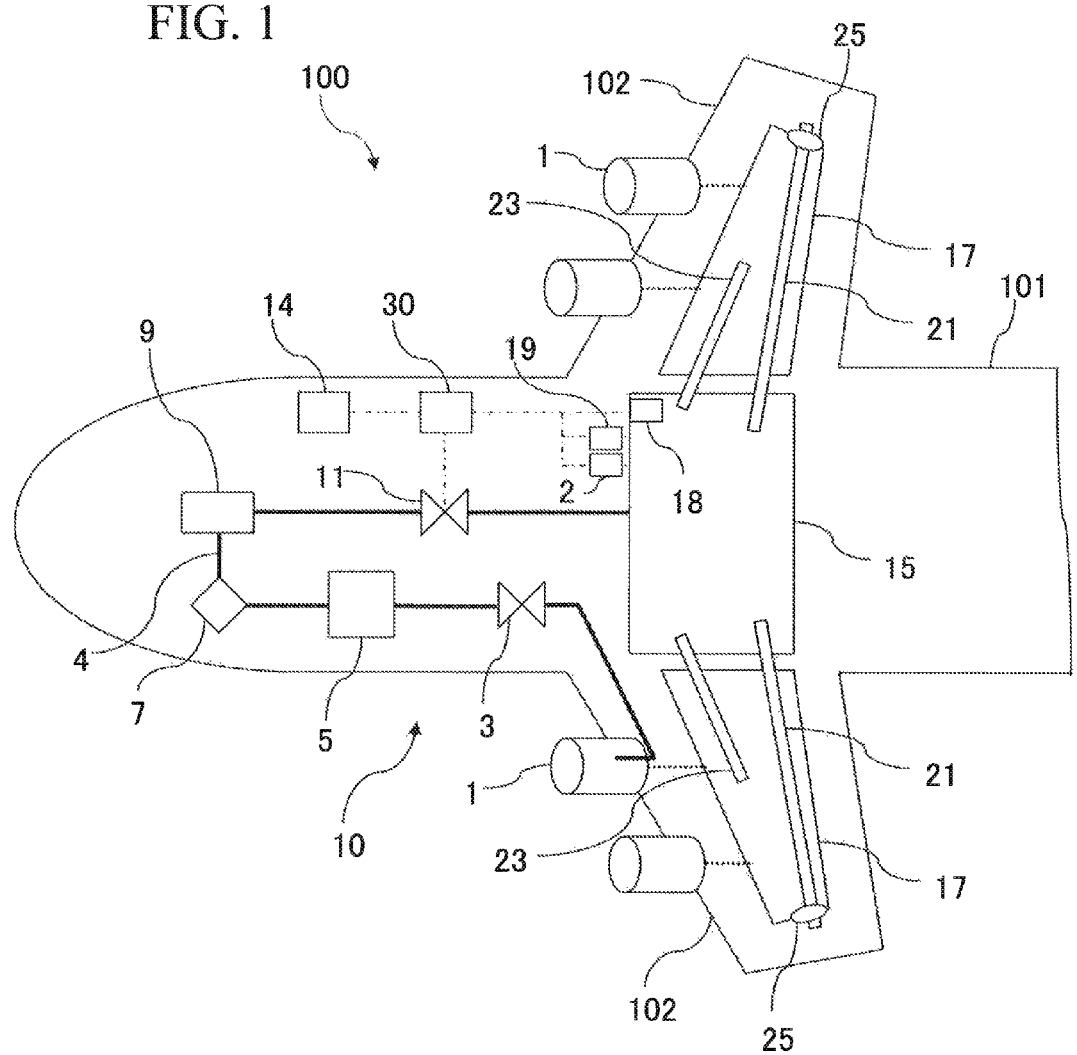
FIG. 1 is a view illustrating a schematic configuration of an aircraft according to a present embodiment.

In the following, an example in which a nitrogen enriched air (NEA) supply system according to the present invention is applied to an aircraft 100 is described in detail based on an embodiment shown in FIGS. 1 and 2.

The aircraft 100 includes a pair of right and left main wings 102, an aircraft fuselage 101 to which the main wings 102 are mounted, a first fuel tank 15 provided in the aircraft fuselage 101, and a second fuel tank 17 provided in each of the main wings 102. A vent pipe 21 and a spill-back pipe 23 are provided between the first fuel tank 15 and one of the second fuel tanks 17, and another vent pipe 21 and another spill-back pipe 23 are provided between the first fuel tank 15 and the other second fuel tanks 17, so as to penetrate the boundary between them.

The vent pipes 21 are provided so as to adjust the internal pressure of the first fuel tank 15. Air is guided into and out of the aircraft through the vent pipes 21. For example, when the external atmospheric pressure is lowered along with an increase in the altitude of the aircraft 100, air occupying an internal space of the first fuel tank 15 is correspondingly discharged outside the aircraft through the vent pipes 21, thereby lowering the internal pressure of the first fuel tank 15. When the aircraft 100 descends, the opposite operation is performed.

The spill-back pipes 23 are provided so as to adjust the amount of fuel in the first fuel tank 15 and the second fuel tanks 17.

Next, an NEA supply system 10 according to the present embodiment is described in detail. The NEA supply system 10 supplies NEA into the first fuel tank 15 provided in the aircraft 100 to thereby prevent explosion of fuel.

The NEA supply system 10 includes a gas pipe 4 that guides bleed air from an engine 1 into the first fuel tank 15. An on-off valve 3, a temperature regulation mechanism 5, a filter 7, an air separation module (ASM) 9, and a flow control valve (FCV) 11 are sequentially disposed on the gas pipe 4. The bleed air from the engine 1 passes through the respective devices in the above order from the on-off valve 3 via the gas pipe 4, and is thereafter supplied to the first fuel tank 15 as the NEA.

Air compressed within the engine 1 that generates a thrust for the aircraft 100 is partially removed as the bleed air, and guided to the on-off valve 3 through the gas pipe 4. Subsequently, the bleed air is guided through the gas pipe 4 to the temperature regulation mechanism 5, where the temperature of the bleed air is regulated. The bleed air then passes through the filter 7, and is guided to the ASM 9.

The temperature regulation mechanism 5 controls the temperature of the bleed air guided to the ASM 9 so as to optimize oxygen removal efficiency since the oxygen removal efficiency of the ASM 9 is related to the temperature. As an example, while the ASM 9 operates efficiently at a temperature ranging from 180° F. to 200° F. (about 82° C. to 93° C.), the temperature of the bleed air from the engine 1 is 300° F. to 500° F. (about 149° C. to 260° C.). Therefore, the bleed air from the engine 1 is cooled in the temperature regulation mechanism 5. A heat exchanger is employed as the temperature regulation mechanism 5. The atmosphere introduced from around the aircraft 100, or cold air obtained by an air conditioner provided in the aircraft 100 may be used as a cooling medium of the heat exchanger. It goes without saying that the heat exchanger is merely an example, and another cooling means may be also employed.

The filter 7 removes a substance that contaminates the ASM 9. If the contaminant is not removed by the filter 7, a polymer membrane constituting the ASM 9 is clogged, and resultantly cannot separate oxygen properly. Thus, desired NEA cannot be obtained.

The ASM 9 includes a hollow fiber polymer membrane as a main constituent element. The NEA is obtained by using a property that oxygen gas permeates through the hollow fiber wall several times more easily than nitrogen gas. That is, when the bleed air passes through the ASM 9, the bleed air is separated into two types of gasses, one of which is oxygen enriched air with a high oxygen concentration produced by permeation through the hollow fiber wall, and the other of which is the NEA produced by passing through the hollow fiber. The ASM 9 including the hollow fiber polymer membrane as the main constituent element is merely an example, and a wide variety of modules that exert the above function, such as an ASM using an oxygen-absorbing polymer membrane, may be applied in the present invention.

The obtained NEA is supplied to the first fuel tank 15 through the gas pipe 4 by the opening/closing operation of the FCV 11. The opening/closing operation of the FCV 11 is controlled by a control unit 30. The opening/closing operation includes regulation of an opening degree. When the opening degree of the FCV 11 is increased, more bleed air is supplied to the ASM 9, so that more NEA can be supplied to the first fuel tank 15. In this case, however, the oxygen concentration in the NEA is increased, and the nitrogen concentration therein is reduced as described above.

The NEA supply system 10 includes a temperature instrument 2, an altimeter 14, a residual fuel detector 18, and a pressure instrument 19 so as to allow the control unit 30 to control the opening/closing operation of the FCV 11.

The temperature instrument 2 detects the temperature of the internal space of the first fuel tank 15. The control unit 30 acquires information regarding the temperature detected by the temperature instrument 2, and obtains dp/dt described later. Not only the temperature of the internal space of the first fuel tank 15, but also the external temperature or the temperature of the NEA downstream of the ASM 9 may be used directly or after correction. Any means capable of measuring and maintaining the temperature within the first fuel tank 15 may be also employed.

The altimeter 14 detects the altitude of the aircraft 100 during a flight. The control unit 30 acquires information regarding the altitude detected by the altimeter 14.

The residual fuel detector 18 detects the amount of fuel remaining in the first fuel tank 15 during a flight. The control unit 30 acquires information regarding the residual fuel detected by the residual fuel detector 18. The control unit 30 holds information regarding the total capacity of the first fuel tank 15. When acquiring the information regarding the residual fuel, the control unit 30 calculates an empty capacity Vu of the internal space of the first fuel tank 15.

The pressure instrument 19 detects the pressure of the internal space of the first fuel tank 15. The control unit 30 acquires information regarding the pressure detected by the pressure instrument 19. The control unit 30 obtains dp/dh described later based on the information regarding the altitude of the aircraft 100 from the altimeter 14 and the information regarding the pressure. The "internal space" means a space above the liquid level of the residual fuel within the first fuel tank 15.

The control unit 30 controls the opening/closing operation of the FCV 11 based on the information regarding the aircraft 100 described above. The control unit 30 also includes control information used for the control. The specific contents are described below.

Next, the contents of controlling the NEA supplied to the first fuel tank 15 are described by reference to FIG. 2. In FIG. 2, a solid line A indicates transition of the nitrogen concentration by the control in the present embodiment, and a solid line A' denotes transition of the oxygen concentration in the present embodiment. Similarly, broken lines B and B' respectively indicate transition of the nitrogen concentration and transition of the oxygen concentration by the control described in U.S. Pat. No. 6,547,188.

Figure 2:
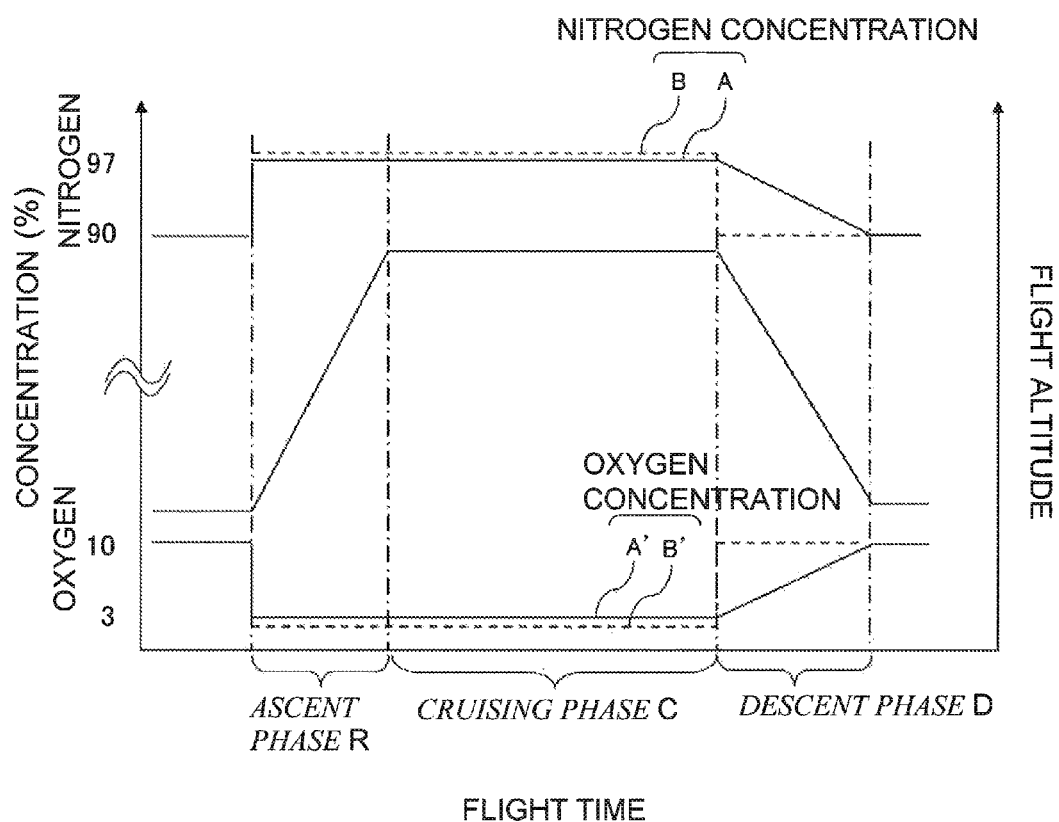
FIG. 2 is a graph collectively illustrating a relationship between a flight time and concentrations of nitrogen and oxygen in nitrogen enriched air supplied into a fuel tank, and a relationship between the flight time and a flight altitude, with the horizontal axis representing the flight elapsed time, the vertical axis on the left side representing the concentrations of nitrogen and oxygen in nitrogen enriched air, and the vertical axis on the right side representing the flight altitude.

As indicated by the solid line A in FIG. 2, the nitrogen concentration in the supplied NEA during an ascent phase R after the aircraft 100 takes off is maintained at a high level of, for example, 97%. This means that the oxygen concentration in the NEA is maintained at a very low level (3%) (the solid line A'). Since the NEA with a low oxygen concentration is supplied to the first fuel tank 15, explosion of fuel is prevented. The nitrogen concentration of 97% is merely an example, and the nitrogen concentration can be preferably selected from a range of 95 to 98%.

In the ascent phase R, the air occupying the internal space of the first fuel tank 15 is normally released outside the aircraft through the vent pipe 21 in response to a decrease in the atmospheric pressure along with an increase in the flight altitude. Thus, in the ascent phase R, as long as the NEA is supplied in an amount corresponding to the consumption of fuel in the flight, the oxygen concentration within the first fuel tank 15 can be maintained low.

Subsequently, in a cruising phase C, it is enough to supply the NEA in an amount mostly corresponding to the consumption of fuel in the flight similarly to the ascent phase R since the aircraft 100 does not experience any rapid change in the altitude. The nitrogen concentration in the NEA in the cruising phase C is set to, for example, 97% similarly to that in the ascent phase R.

The present embodiment is featured by the control of the nitrogen concentration in the NEA in a descent phase D from the cruising phase C until landing.

When the flight altitude is lowered along with descending of the aircraft 100, outside air flows into the first fuel tank 15 from a vent port 25 in response to an increase in the atmospheric pressure. As a result, the NEA and the outside air are mixed in the first fuel tank 15, and the oxygen concentration within the internal space of the first fuel tank 15 is increased. Thus, it is necessary to increase the supply of the NEA to the first fuel tank 15 by increasing the amount of the bleed air passing through the ASM 9. However, if the amount of the bleed air passing through the ASM 9 is increased to more than a certain amount, the separation performance of the ASM 9 for oxygen molecules is deteriorated, and the nitrogen concentration in the NEA is lowered. Thus, the nitrogen concentration in the NEA supplied into the first fuel tank 15 in the descent phase D becomes lower than the nitrogen concentration in the ascent phase R and the cruising phase C. That is, in the descent phase D, the NEA having a higher oxygen concentration than that in the ascent phase R and the cruising phase C is supplied.

In U.S. Pat. No. 6,547,188, the nitrogen concentration in the NEA is rapidly lowered from 98% to 88% in an initial stage of the descent phase (the second phase) (U.S. Pat. No. 6,547,188, FIG. 2). It is thus understood that the supply of the NEA is rapidly increased in U.S. Pat. No. 6,547,188.

Meanwhile, in the present embodiment, it is controlled such that the nitrogen concentration in the NEA is slowly and continuously lowered as indicated by the solid line A. Since the nitrogen concentration in the NEA is gradually decreased, the NEA having a higher nitrogen gas concentration than that in the descent phase D in U.S. Pat. No. 6,547,188 can be supplied to the first fuel tank 15 in the descent phase D. The oxygen concentration in the supplied NEA can be thereby slowly and continuously raised (gradually increased), which means that the risk of fuel explosion can be suppressed.

A form of gradually decreasing the nitrogen concentration is not limited to a linear shape indicated by the solid line A in FIG. 2, but may be a step-like shape, or a quadratic curve shape.

In the present embodiment, the supply of the NEA to the first fuel tank 15 is controlled as follows so as to obtain the nitrogen concentration in the NEA in the descent phase D as indicated by the solid line A in FIG. 2.

In the descent phase D, as the flight altitude is lowered, the external atmospheric pressure becomes higher. It is thus necessary to balance the pressure inside the first fuel tank 15 with the external atmospheric pressure by increasing the pressure inside the first fuel tank 15. In the present embodiment, a state equation (an expression (1)) for ideal gas is applied to the gas occupying the internal space of the fuel tank, thereby calculating the physical amount of the gas required for balancing with the external atmospheric pressure. In the present embodiment in which the following expression (1) is applied, P is the pressure of the gas occupying the internal space of the first fuel tank 15, and V is the volume of the internal space of the first fuel tank 15. The internal space means a space except for the space occupied by the fuel in the first fuel tank 15.

$$P \cdot V = n \cdot R \cdot T \quad (1)$$

(P: Pressure of gas, V: Volume of gas, n: Physical amount of gas, R: Constant of gas, T: Temperature of gas)

The pressure (P) is a parameter that changes in the state equation for the gas along with a decrease (or an increase) in the altitude of the aircraft 100. A solution to be obtained (the supply) is a variation Δn of the physical amount (n, mole number) of the NEA for balancing with the pressure. In the following, the physical amount of the gas is sometimes referred to as a required amount Fn.

In the expression (1), the empty capacity (Vu) of the internal space of the first fuel tank 15 is employed as V, and a pressure variation ΔP of the internal space of the first fuel tank 15 is employed as P. In this case, the expression (1) can be translated into a following expression (2). Thus, Δn (Fn) can be obtained by an expression (3).

As expressed in an expression (4), ΔP is a pressure variation (dp/dt) per unit time within the first fuel tank 15. The pressure variation (dp/dt) per unit time can be directly obtained by successively measuring the pressure by the pressure instrument 19. The pressure variation ΔP can be also obtained by multiplying a variation ratio (dp/dh) of the pressure of the internal space along with a change in the altitude of the aircraft 100, by a variation ratio of the altitude of the aircraft 100 per unit time (here, a descent ratio, dh/dt).

$$\Delta P \cdot Vu = \Delta n \cdot R \cdot T \quad (2)$$

$$\Delta n = \Delta P \cdot Vu / R \cdot T \quad (3)$$

$$\Delta P : dp/dh \times dh/dt = dp/dt \quad (4)$$

Since Δn is the mole number of the gas, an expression (5) can be applied so as to convert the mole number to, for example, the required amount Fn (unit: lb (pound)) per minute when the air is supplied.

$$Fn = \Delta n \times 28.8 \times 10^{-3} \times 2.2 \times 60 \text{ (lb/min.)} \quad (5)$$

In the expression (5), 28.8 is the molecular weight of the air (oxygen: 20%, nitrogen: 80%), which is multiplied by $10^{-3}$ so as to be converted to mass (kg), further multiplied by 2.2 so as to be converted to pound, and lastly multiplied by 60 so as to be converted to the amount per minute. Although the molecular weight of the air is used in the expression (5), the molecular weight of the NEA based on the oxygen concentration (or the nitrogen concentration) in the NEA is applied to the term of the molecular weight of the air in actual cases.

Figure 3:
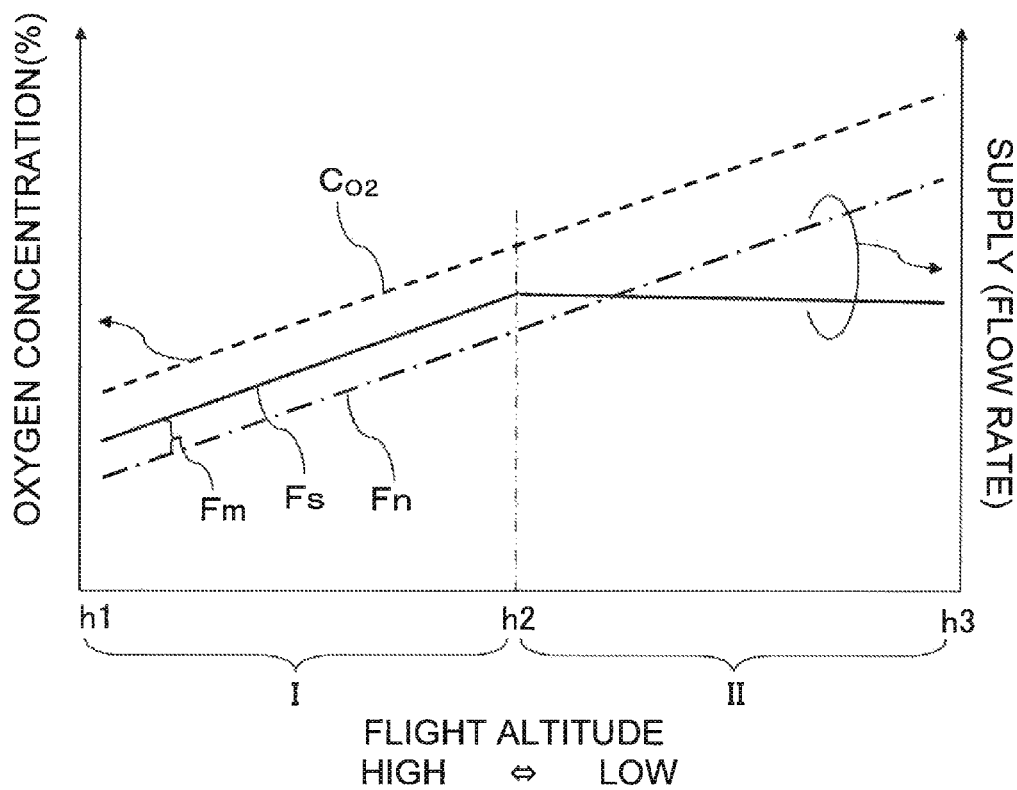
FIG. 3 is a graph illustrating a control example of the supply of nitrogen enriched air in a descent phase, with the horizontal axis representing the flight altitude of an aircraft 100, the vertical axis on the left side representing the oxygen concentration of a first fuel tank 15, and the vertical axis on the right side representing the flow rate of nitrogen enriched air supplied to the first fuel tank 15.

The required amount Fn obtained as described above is increased as the altitude of the aircraft 100 is lowered as shown in FIG. 3.

The control unit 30 further holds data regarding an NEA supply flow rate Fs (referred to as supply flow rate Fs below) corresponding to the required amount Fn. One example thereof is shown in FIG. 3. The supply flow rate Fs is divided into a region in which the altitude of the aircraft 100 is h1 to h2 (a region I) and a region in which the altitude is h2 to h3 (a region II). It is assumed that the altitude h1 is at the same level as that of the cruising phase, the altitude h2 is, for example, 10000 feet (an example of reference value), and the altitude h3 is at the same level as the ground.

In the region I, the supply flow rate Fs is proportionally increased similarly to the required amount Fn. The supply flow rate Fs is set to be larger than the required amount Fn at the same altitude. Although the supply flow rate Fs is ideally matched with the required amount Fn, the supply flow rate Fs is set to be larger than the required amount Fn so as to reliably supply a required amount of NEA into the first fuel tank 15. To avoid excessive supply of the NEA, a value obtained by adding a small margin flow rate Fm (a constant) to the required amount Fn may be employed as the supply flow rate Fs. The margin flow rate Fm is not limited to the constant, and may be also set to a value obtained by multiplying the required amount Fn by a predetermined ratio (e.g., 0.2 to 0.4). Accordingly, the oxygen concentration within the first fuel tank 15 can be gradually increased with the supply flow rate Fs kept at a minimum required level based on the required amount Fn. The amount of the NEA unnecessarily flowing out of the aircraft from the vent pipes 21 can be also reduced.

In the region I, the oxygen concentration within the first fuel tank 15 can be maintained low. This is because the supply flow rate Fs is kept at a minimum required level based on the required amount Fn. Meanwhile, if the supply of the NEA is rapidly increased as in U.S. Pat. No. 6,547, 188, the amount of oxygen contained in the NEA is increased, so that the oxygen concentration within the first fuel tank 15 becomes high.

As described above, when the flow rate of the NEA is increased, the oxygen concentration in the NEA is increased. Thus, when entering the region II, the supply flow rate Fs of the NEA is limited such that an oxygen concentration $C_{O2}$ does not exceed an oxygen concentration required for preventing explosion. In this case, the oxygen concentration $C_{O2}$ within the first fuel tank 15 is increased since air is introduced into the first fuel tank 15 from the vent port 25. However, even when the introduced air contains a substantial amount of oxygen, the oxygen concentration within the first fuel tank 15 can be maintained at a value not possibly causing explosion since the oxygen concentration is maintained low in the region I.

As described above, the control unit 30 incorporates a timer (chronometer). When acquiring the information regarding the altitude of the aircraft 100 from the altimeter 14, the control unit 30 obtains dh/dt based on time information from the incorporated timer, and the acquired information regarding the altitude.

Since the control unit 30 obtains the empty capacity Vu of the internal space, and the pressure variation dp/dh within the internal space with respect to the altitude, and also acquires the information T regarding the temperature from the temperature instrument 2, the required amount Fn can be accurately obtained based on the above expressions (3) and (4). Known information may be also employed as dp/dh. When the required amount Fn is obtained, the opening degree of the FCV 11, i.e., the supply flow rate Fs is identified.

For example, data in the table form in which the required amount Fn, the value obtained by adding the margin flow rate Fm to the required amount Fn, and the opening degree of the FCV 11 are related to each other can be used therein. In this case, the control unit 30 holds the data in the table form. When the required amount Fn is obtained, the control unit 30 refers to the data in the table form to identify the supply flow rate Fs, i.e., the opening degree of the FCV 11 related to the required amount Fn. The control unit 30 regulates the opening degree of the FCV 11 based on the opening degree to thereby control the supply flow rate Fs.

Controlling the supply by use of the data in the table form is merely an example. It goes without saying that an arithmetic expression (function) corresponding to the data in the table form may be used every time the required amount Fn is obtained, or the supply flow rate Fs may be obtained by sequentially adding the margin flow rate Fm to the required amount Fn when the required amount Fn is obtained.

As described above, in accordance with the present embodiment, the supply of the NEA with a higher nitrogen concentration can be ensured in the descent phase D, so that the risk of fuel explosion within the first fuel tank 15 can be reduced. Furthermore, since the supply of the NEA is continuously and slowly increased, the consumption of the bleed air can be maintained low. Thus, the fuel consumption of the engine 1 can be improved as compared to a case in which the supply of the NEA is rapidly increased.

Although the minimum required supply of the NEA into the first fuel tank 15 and the method for supply have been described by using the state equation for the gas in the above embodiment, constitutions described in the embodiment described above may be also freely selected or changed into other constitutions without departing from the gist of the present invention.

For example, an oxygen concentration detector may be provided within the first fuel tank 15. When the detected oxygen concentration is higher than the oxygen concentration $C_{O2}$ in FIG. 3, the actually-supplied NEA is determined to be supplied more than the supply flow rate Fs, and the control unit 30 corrects the control so as to narrow the opening degree of the FCV 11. The NEA can be thereby supplied in an amount corresponding to the supply flow rate Fs. Of course, the control can be also corrected when the oxygen concentration is lower than the oxygen concentration $C_{O2}$.

What is claimed is:

1. A nitrogen enriched air supply system which supplies nitrogen enriched air that is enriched with nitrogen to a fuel tank of an aircraft, the system comprising:
    a nitrogen enrichment unit that produces the nitrogen enriched air upon supply of bleed air from a flight engine of the aircraft;
    a flow regulation unit that controls a supply of the nitrogen enriched air to the fuel tank;
    a residual fuel detector that detects an amount of liquid fuel remaining in the fuel tank during a flight of the aircraft; and
    a control unit that controls the supply in the flow regulation unit and acquires information regarding the amount of residual liquid fuel detected by the residual fuel detector,
    wherein the control unit controls a supply flow rate Fs of the nitrogen enriched air which is supplied to the fuel tank so as to gradually increase in at least a part of a descent phase of the aircraft, the supply flow rate Fs being dependent upon the amount of residual liquid fuel remaining in the fuel tank.

2. The nitrogen enriched air supply system according to claim 1, wherein the system further includes an altimeter that detects an altitude of the aircraft during a flight, the control unit acquires information regarding the altitude detected by the altimeter, and controls the supply flow rate Fs not to be increased, when the detected altitude reaches a reference value or a value lower than the reference value in the descent phase of the aircraft.

3. The nitrogen enriched air supply system according to claim 1, wherein
    an oxygen concentration in the nitrogen enriched air gradually increases, in at least the part of the descent phase of the aircraft.

4. The nitrogen enriched air supply system according to claim 1, wherein
    a nitrogen concentration in the nitrogen enriched air gradually decreases, in at least the part of the descent phase of the aircraft.

5. An aircraft comprising the nitrogen enriched air supply system according to claim 1.

6. The nitrogen enriched air supply according to claim 1, wherein the nitrogen enrichment unit comprises a polymer membrane that decreases a concentration of nitrogen contained in the nitrogen enriched air supplied to the fuel tank in the descent phase of the aircraft and increases a concentration of oxygen contained in the nitrogen enriched air supplied to the fuel tank in the descent phase of the aircraft.

7. The nitrogen enriched air supply according to claim 1, further comprising:
    a temperature instrument that detects a temperature of an internal space of the fuel tank,
    wherein the control unit acquires information regarding the temperature detected by the temperature instrument, the supply flow rate Fs being dependent upon the temperature.

* * * * *